United States Patent [19]

Zeiser

[11] Patent Number: 5,332,015
[45] Date of Patent: Jul. 26, 1994

[54] ANTI-SKID DEVICE FOR MOTOR VEHICLES

[75] Inventor: Erich P. A. Zeiser, Aalen-Wasseralfingen, Fed. Rep. of Germany

[73] Assignee: RUD-Kettenfabrik Rieger & Dietz GmbH. u. Co, Aalen, Fed. Rep. of Germany

[21] Appl. No.: 58,584

[22] Filed: May 6, 1993

[30] Foreign Application Priority Data

May 8, 1992 [DE] Fed. Rep. of Germany ....... 4215370

[51] Int. Cl.$^5$ ............................................. B60C 27/02
[52] U.S. Cl. .................................. 152/208; 152/215; 152/231
[58] Field of Search ............... 152/208, 231, 233, 232, 152/213 R, 214, 215

[56] References Cited

U.S. PATENT DOCUMENTS

| | | | |
|---|---|---|---|
| 4,030,701 | 6/1977 | Pingon | 254/124 |
| 4,299,310 | 11/1981 | Törnebäck | 152/208 X |
| 4,745,993 | 5/1988 | Schulz et al. | 152/208 X |

FOREIGN PATENT DOCUMENTS

| | | |
|---|---|---|
| 162823 | 8/1988 | European Pat. Off. . |
| 1330373 | 9/1973 | United Kingdom . |

*Primary Examiner*—Michael W. Ball
*Assistant Examiner*—Francis J. Lorin
*Attorney, Agent, or Firm*—Mark P. Stone

[57] ABSTRACT

An anti-skid device for vehicles comprising a plurality of chain strands fastened to a holder which can be set in a rotational movement by means of the wheel of a vehicle against which the holder can be moved an pressed by a carrier. To move the carrier, a drive unit is used which can be operated by compressed gas. The compressed gas is delivered by a gas reservoir formed by at least one exchangeable compressed-gas cartridge which can be opened and connected to a gas pipe leading to the drive unit by means of a device in the driver's cab of the vehicle comprising a lever and a plunger for actuating a hollow needle piercing through he seal of the compressed-gas cartridge.

17 Claims, 4 Drawing Sheets

ANTI-SKID DEVICE FOR MOTOR VEHICLES

BACKGROUND OF THE INVENTION

The invention relates to an anti-skid device for motor vehicles, with a plurality of chain lines which are fastened to a holder capable of being set in rotational movement and of which the ends facing away from the holder, with the holder rotating in the operating position, are thrown away from the holder under the effect of centrifugal force into the region of the ground contact surface of a rotating vehicle tire, with a carrier mounted on the vehicle and intended for the holder, and with a drive unit which, from the driver's cab of the vehicle, can be subjected by way of a compressed-gas pipe to the pressure of a gaseous mediumhand by means of which the carrier can be moved out of a position of rest into the operating position.

There are known anti-skid devices of the foregoing type, of which the drive unit for the carrier usually designed as a pivotable jib arm can be subjected to compressed air from a compressed-air system present in the vehicle for braking purposes (EP 0,162,823 B1). It goes without saying that this possibility for actuating the drive unit is unavailable on vehicles without compressed-air braking systems, that is to say particularly on light lorries or small buses. In order, here too, to ensure that the anti-skid device can be operated from the driver's seat with similar ease to heavy-goods vehicles and omnibuses, it has already been suggested to equip the corresponding smaller vehicles with a separate compressed-air generating system in order to operate the anti-skid device. However, in practice, putting this idea into effect and using it widely have always been unsuccessful for reasons of cost, space and safety.

SUMMARY OF THE INVENTION

The object on which the invention is based is to find a way of making it possible by simple means, in vehicles without compressed-air generating systems which are present or are to be installed in addition, to transfer anti-skid devices of the the under discussion at least out of their position of rest into their operating position, the return into the initial position being capable of taking place easily by means of a return spring. According to the invention, this object is achieved in a surprisingly simple way in that the compressed-gas pipe for the drive unit actuating the carrier can be connected to an autonomous compressed-gas reservoir formed by a commercially available exchangeable compressed-gas cartridge.

By commercially available compressed-gas cartridges are meant, here, such compressed-gas cartridges as are used particularly in association with siphons and cream preparers and for piping up bicycle tubes. Compressed-gas cartridges of this type are generally filled with carbon dioxide or nitrogen, and the gas pressure prevailing in them is a multiple higher than the air pressure in current vehicle braking systems. The highly compressed gas quantity is therefore sufficient to activate customary drive units, equipped with a rolling diaphragm or a piston, for initiating movements in the carrier of relevant anti-skid devices, the respective drive unit usually being connected to the carrier via a Bowden pull.

BRIEF DESCRIPTION OF THE DRAWINGS

Further details and features of the invention emerge from the subclaims and from the following description of two especially advantageous embodiments illustrated in the accompanying drawing. In this:

DESCRIPTION OF THE BEST MODES FOR CARRYING OUT THE INVENTION

Figure 1:
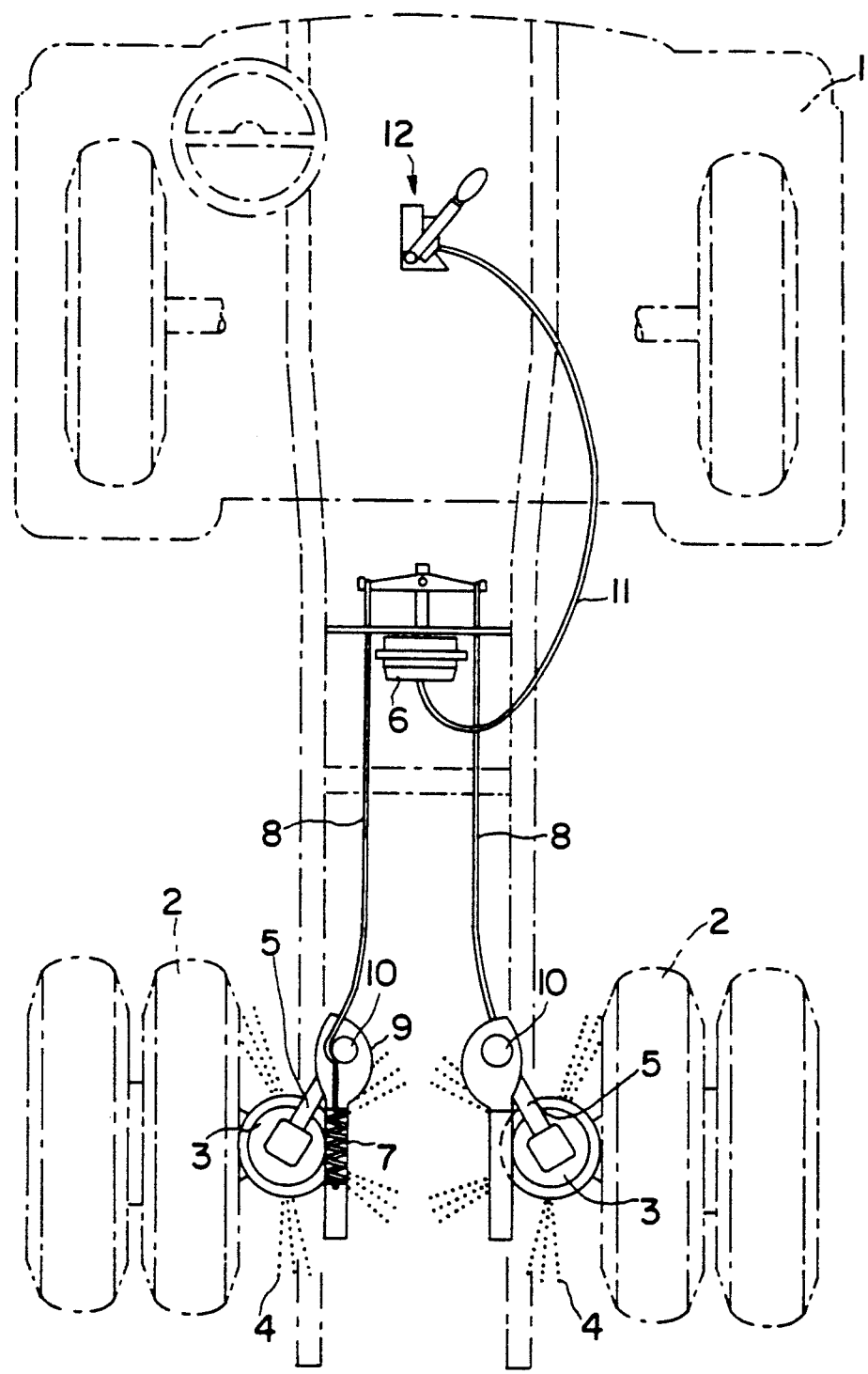
FIG. 1 shows the top view of two anti-skid devices and the means necessary for actuating them.

In FIG. 1, 1 is the driver's cab of a light lorry which does not have its own compressed-air generating system with its conventional components, such as a compressor, compressed-air reservoir and the like. The rear tire 2 of the vehicle is assigned two anti-skid devices which consist in a known way of a holder 3, designed as a friction wheel, for a multiplicity of chain lines 4, of a pivotable carrier 5 for the holder 3, of a drive unit 6 for transferring the holders 3 out of the position of rest into the operating position showing in FIG. 1, and of return springs 7 for returning the holders 3 out of their operating position into a position of rest, the drive unit 6, which preferably consists of a working cylinder and of a rolling diaphragm, being connected via Bowden pulls 8 and the return springs 7 via a pull line 9 to the pivot axles 10 of the carriers 5, so that oppositely directed movements can be initiated in the pivot axles 10.

The drive unit 6 is connected by way of a compressed-gas pipe 11 to a compressed-gas source 12 which is arranged in the driver's cab 1 and which, as shown in FIGS. 2 to 6, is equipped with an independent compressed-gas reservoir formed by at least one exchangeable compressed-gas cartridge 13.

Figure 2:
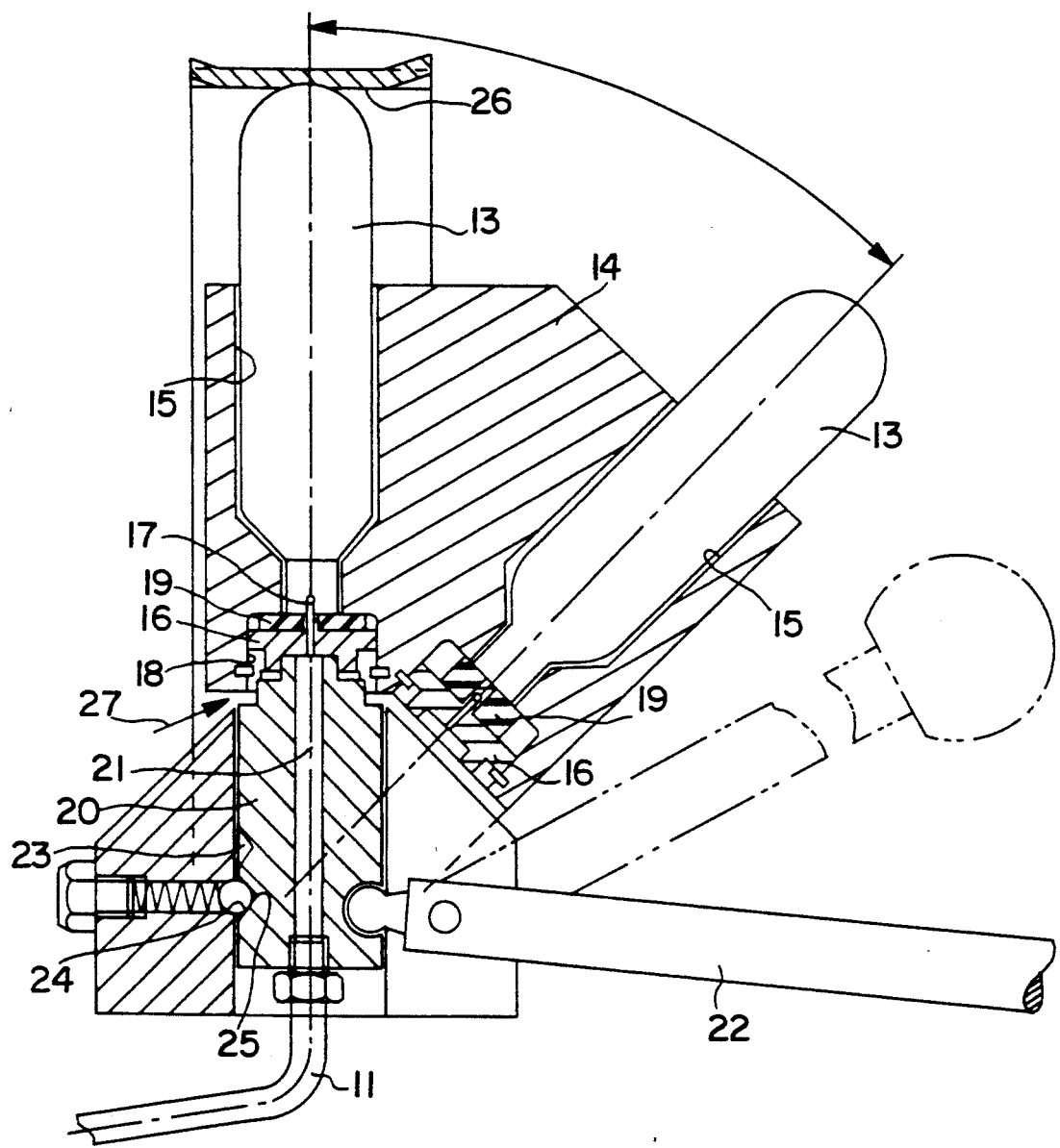
FIG. 2 shows a section through a first compressed-gas source for the drive unit transferring the anti-skid devices out of their position of rest into their operating position.

An especially handy and simply designed compressed-gas source is illustrated in FIG. 2. It has a pivotable magazine 14 with receptacles 15 for two compressed-gas cartridges 13. There serves for opening each of the compressed-gas cartridges 13 a hollow needle 17 .which is held by a thrust piece 16 and which can pierce the seal of the compressed-gas cartridge 13 in a known way. The magazine 14 is provided with chambers 18, in each of which a thrust piece 16 is guided so as to be movable to and fro by limited amounts. An annular gasket 19 surrounding the hollow needle 17 is arranged between the respective thrust piece 16 and the head of the compressed-gas cartridge 13 to be opened.

There serves for actuating the thrust piece 16 of the hollow needle 17 a plunger 20 provided with a bore 21 which is aligned with the hollow needle 17 and of which the end facing away from the hollow needle 17 is connected to the compressed-gas pipe 11. It is possible to introduce into the plunger 20 by means of a manually actuable lever 22 a to-and-fro movement of which the end positions are defined by a catch mechanism with two catch grooves 23, 24 and a catch ball 25. As can be seen from FIG. 2, during the piercing of the seal of the cartridge the end of the respective compressed-gas cartridge 13 to be opened bears against a stop 26 formed by the yoke of a clip. The compressed-gas cartridge 13 consequently cannot shift away when the hollow needle 17 penetrates into it.

While the anti-skid device is in use, the plunger 20 remains in the position shown in FIG. 2. When the anti-skid device is to be returned from its operating position into the position of rest, the lever 22 is pivoted in the anti-clockwise direction in FIG. 2. The plunger 20 moves back and the compressed gas in the cylinder of the drive unit 16 can escape by way of an annular gap indicated by the arrow 27. The return spring 7 (see FIG. 1) thereafter pulls the carrier 5 back into its initial position.

In the embodiment according to FIGS. 3 to 6, the magazine 28 is formed by a drum having a larger number of receptacles 15 for compressed-gas cartridges 13. The magazine 28 is mounted rotatably by means of an axle 29 in a housing 30, in which a plunger 31 for a thrust piece 32 designed with a hollow needle 17 is also guided. A releasable stop 33 for all the compressed-gas cartridges 13 secures them in position in the receptacles 15.

On the circumference of the magazine 28, the latter has a control cam 34, via which a rotational movement can be introduced into the magazine 28 by means of a lever 35 which also serves for actuating the plunger 31. The lever 35 is provided, for this purpose, with a control rod 36 which engages by means of a projection 37 into the control cam 34.

Figure 3:
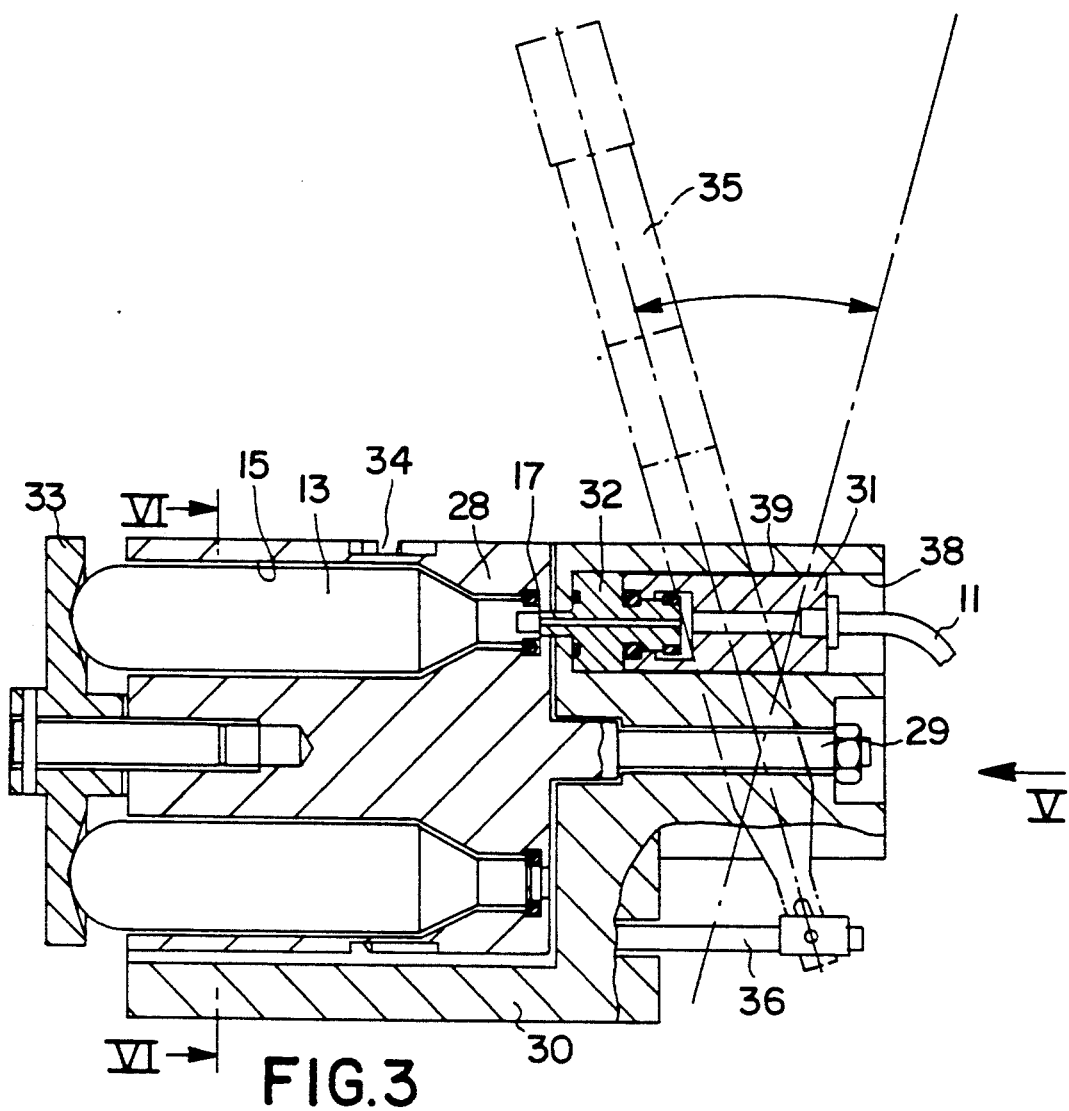
FIG. 3 shows a section through a second compressed-gas source for the drive unit, for transferring the anti-skid devices out of their position of rest into their operating position.
Figure 4:
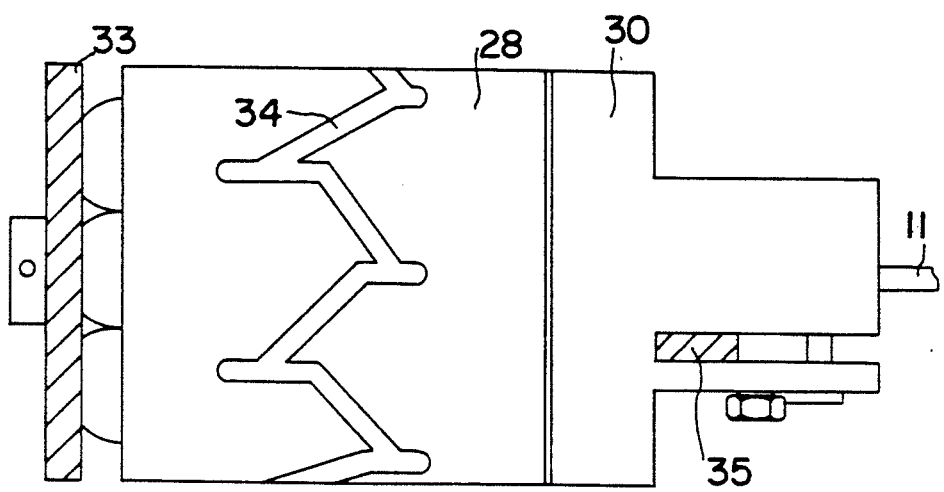
FIG. 4 shows a partial top view of the compressed-gas source according to FIG. 3.
Figure 5:
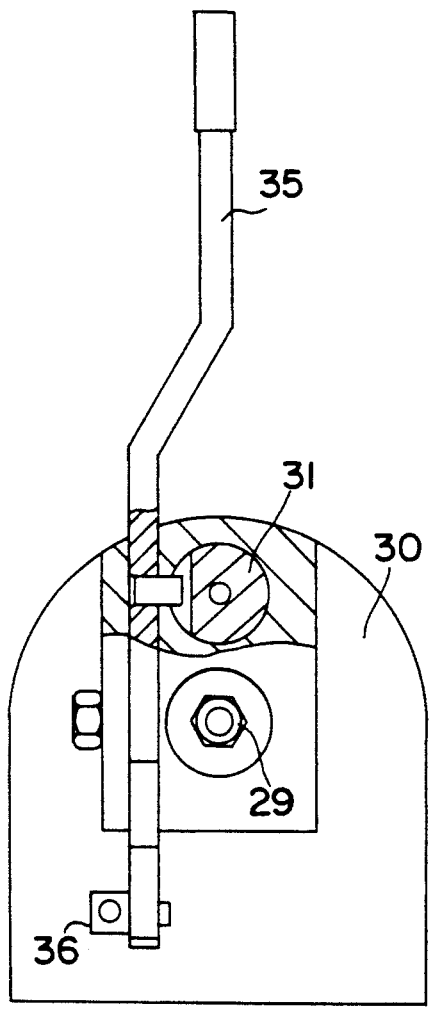
FIG. 5 shows, partially in section, a view of the compressed-gas source according to FIGS. 3 and 4 in the direction of the arrow V in FIG. 3.
Figure 6:
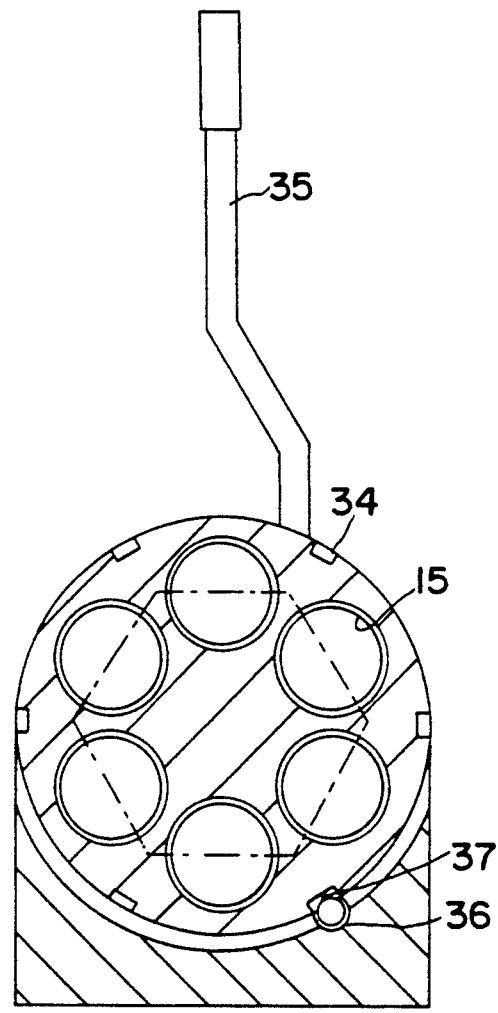
FIG. 6 shows a section along the line VI—VI in FIG. 3.

So that, in the embodiment according to FIGS. 3 to 6, the drive unit 6 can be made pressureless, the bore 38, in which the plunger 31 and the thrust piece 32 are guided, is provided with a vent groove 39, out of which the compressed gas can flow as soon as the plunger 31 is displaced to the right out of the position shown in FIG. 3. During this displacement, the plunger 31 takes up the thrust piece 32, so that the hollow needle 17 is moved away out of the range of rotation of the magazine 28. By means of two respective to-and-fro movements of the lever 35, the next compressed-gas cartridge 13 can be transferred into a position aligned with the plunger 31.

I claim:

1. An anti-skid device for motor vehicles, said device comprising a plurality of chain strands (4) fastened to a holder (3) capable of being set in rotational movement and whose ends facing away from the holder (3), with the holder (3) rotating in an operating position, are propelled away from the holder (3) under the effect of centrifugal force into the region of the ground contact surface of a rotating vehicle tire (2), with a carrier (5) mounted on a vehicle for the holder (3), and with a drive unit (6) which, from a driver's cab (1) of the vehicle, can be subjected by way of a compressed-gas pipe (11) to the pressure of a gaseous medium and by means of which the carrier (5) can be moved out of a rest position and into its operating position, wherein the compressed-gas pipe (11) can be connected to a compressed-gas reservoir formed by an exchangeable compressed-gas cartridge (13), said anti-skid device further comprising means for opening said compressed-gas cartridge arranged int eh driver's cab of said motor vehicle, said means for opening including a magazine for a plurality of said compressed-gas cartridges (13).

2. An anti-skid device for a motor vehicle, said device comprising a plurality of chain strands (4) fastened to a holder (3) capable of being set in rotational movement, the ends of which strands facing away from the holder (3), with the holder (3) rotating in an operating position, ar propelled away from the holder (3) under the effect of centrifugal force into the region of the ground contact surface of a rotating vehicle tire (2), with a carrier (5) for the holder (3) mounted don a vehicle and with a drive unit (6) which, from a driver's cab (1) of the vehicle, can be subjected by way of a compressed-gas pipe (11) to the pressure of a gaseous medium and by means of which the carrier (5) can be moved out of a rest position and into its operating position, wherein the compressed-gas pipe (11) can be connected to a compressed-gas reservoir formed by and exchangeable compressed-gas cartridge (13) by means of a device arranged in the driver's cab (1) of the vehicle, said device in said driver's cab comprising a manually actuable lever (22) for moving a plunger (20, 31) between two positions (23-25), said plunger (20, 31) having a bore to one end of which the compressed-gas pipe (11) is connected while its end facing away from the compressed-gas pipe (11) serves for actuating a hollow needle (17) piercing through a seal of compressed-gas cartridge (13).

3. An anti-skid device as claimed in claim 2, wherein the hollow needle (17) is fixed to the center of a thrust piece (16, 32) which is displaceable by the plunger (20, 31) to an fro in limited amounts defined by a catch mechanism (23-25).

4. An anti-ski device as claimed in claim 3, wherein an annular gasket (19) surrounding the hollow needle (17) is arranged between the thrust piece (16) and the end of the compressed-gas cartridge (13) to be opened.

5. An anti-skid device as claimed in claim 2, wherein the device for opening the compressed-gas cartridge (13) is provided with a magazine (14, 28) for a plurality of compressed-gas cartridges (13).

6. M anti-skid device as claimed in claim 5, wherein the magazine (14) is pivotable and has receptacles (15) for at least two compressed-gas cartridges (13).

7. An anti-skid device as claimed in claim 6, wherein the receptacles (15) are pivotable out of a feed position into an opening position, in which the rear end of the respective compressed-gas cartridge (13) to be opened bears against a stop (26).

8. An anti-skid device as claimed in claim 6, wherein each receptacle (15) of the magazine (14) is preceded by a thrust piece (16) and an annular gasket (19).

9. An anti-skid device as claimed in claim 5, wherein the magazine (28) forms a drum rotatable about an axle (29) and having a multiplicity of receptacles (15) for said plurality of compressed-gas cartridges (13).

10. An anti-skid device as claimed in claim 9, wherein a stop (26) for the ends of the compressed-gas cartridges (13) introduced into the receptacles (15) is arranged releasably on the side of the magazine (28) from which the compressed-gas cartridges (13) can be introduced into their receptacles (15).

11. M anti-skid device as claimed in claim 9, wherein the circumference of the magazine (28) is provided with a control cam (34) for introducing a rotational movement into the magazine (28).

12. An anti-skid device as claimed in claim 11, wherein a single lever (35) engages said control (34) for introducing the rotational movement into the magazine (28) and for opening the compressed-gas cartridge (13).

13. An anti-skid device as claimed in claim 2, wherein the carrier (5) for the holder (3) can be moved out of the operating position back into the position of rest by means of a return spring (7).

14. Am anti-skid device as claimed in claim 2, wherein the carrier (5 for the holder (3) is designed as a pivotable jib arm.

15. An anti-skid device as claimed in claim 2, wherein the drive unit (6) is connected to the carrier (5) via a Bowden pull (8).

16. An anti-skid device as claimed in claim 10, wherein the circumference of the magazine (28) is provided with a control cam (34) for introducing a rotational movement into the magazine (28).

17. An anti-skid device as claimed in claim 16, wherein a single lever (35) serves for introducing the rotational movement into the magazine (28) and for opening the compressed-gas cartridge (13).

* * * * *

UNITED STATES PATENT AND TRADEMARK OFFICE
CERTIFICATE OF CORRECTION

PATENT NO. : 5,332,015
DATED : July 26, 1994
INVENTOR(S) : Erich P.A. Zeiser

It is certified that error appears in the above-indentified patent and that said Letters Patent is hereby corrected as shown below:

Column 3, Line 68: Delete "int eh" and substitute - -in the-

Column 4, Line 8: Delete "ar" and substitute - -are- -.

Column 4, Line 11: Delete "don" and substitute - -on- -.

Column 4, Line 18: Delete "and" and substitute - -an- -.

Column 4, Line 42: Delete "M" and substitute - -An- -.

Column 4, Line 63: Delete "M" and substitute - -An- -.
Column 5, Claim 14, Line 1: Delete "Am" and substitute - -An- -.
Column 5, Claim 14, Line 2: Delete "(5" and substitute - -(5)- -.

Signed and Sealed this

Twenty-seventh Day of September, 1994

Attest:

BRUCE LEHMAN

Attesting Officer     Commissioner of Patents and Trademarks